United States Patent [19]

Green, Jr. et al.

[11] Patent Number: 4,470,698
[45] Date of Patent: Sep. 11, 1984

[54] PROGRAMMABLE SCANNER/TRACKER

[75] Inventors: William J. Green, Jr., Vernon, Conn.; Robert J. Mongeon, East Longmeadow, Mass.; Robert E. Wolff, Sr., Ann Arbor, Mich.; Randall O. Decker, Vernon, Conn.

[73] Assignee: The United States of America as represented by the Secretary of the Army, Washington, D.C.

[21] Appl. No.: 377,727

[22] Filed: May 13, 1982

[51] Int. Cl.³ .................... G01D 5/34; G01B 11/26
[52] U.S. Cl. .................... 356/152; 250/231 SE; 350/6.4
[58] Field of Search .................... 350/6.2, 6.4; 250/231 SE; 356/152, 141, 5

[56] References Cited

U.S. PATENT DOCUMENTS

| | | | | |
|---|---|---|---|---|
| 2,975,668 | 3/1961 | Eckel | .................... | 350/6.4 |
| 3,378,687 | 4/1968 | Schepler | .................... | 350/6.4 |
| 4,311,384 | 1/1982 | Keene | .................... | 350/6.4 |
| 4,335,306 | 6/1982 | Gort et al. | .................... | 250/231 SE |
| 4,410,798 | 10/1983 | Breslow | .................... | 250/231 SE |

FOREIGN PATENT DOCUMENTS 54-36755  3/1979  Japan .................... 250/231 SE Primary Examiner—S. C. Buczinski
Attorney, Agent, or Firm—Anthony T. Lane; Jeremiah G. Murray; Edward Goldberg

[57] ABSTRACT

A scanning and/or tracking mechanism for use in airborne obstacle avoidance optical radars operating in the infrared region. The radar beam is scanned by passing it through a pair of in-line rotating optical wedges which rotate around the boresight axis and which are transparent to the infrared radiation. The wedges are separately driven by servo systems including hollow shaft torque motors with the wedges mounted in the hollow shafts thereof. A high resolution and low backlash shaft position encoder is utilized comprising encoding discs directly driven by the optical wedges and including a novel decoding system.

4 Claims, 7 Drawing Figures

PROGRAMMABLE SCANNER/TRACKER

The Government has rights in this invention pursuant to Contract No. DAAB07-76-C-0920, awarded by the Department of the Army.

BACKGROUND OF THE INVENTION

This invention relates to a scanning and/or tracking mechanism intended for use as part of either an optical obstacle avoidance or target tracking airborne radar set. Such radar sets are used on helicopters and other low flying aircraft to detect obstacles or track targets in the aircraft's flight path by transmitting forward of the craft a laser-generated coherent beam in the infra-red region and detecting the echo signals from obstacles such as power lines, hills, trees and buildings.

Such radars require a scanning and tracking mechanism for moving the transmitted beam in some systematic manner over the field of view. For efficient operation, the field of view should extend for approximately 15° to 30° in both azimuth and elevation on all sides of the fore and aft (or roll) axis of the aircraft. Thus a field of view from approximately 30° to 60° is required.

The scanner/tracker which is the subject of this invention is analogous in many ways to the antenna of a microwave radar, and more particularly to a steerable antenna of such a radar. The scanner/tracker utilizes a pair of rotating optical wedges to provide scanning of the radar beam over the field of view. This type of scanning mechanism provides the largest field of view for a given aperture.

The coherent transmitted beam has an extremely narrow beam-width and thus such an optical radar has a capability for extremely high angular (or cross-range) resolution. In order to achieve this high resolution the angular position of the optical wedges which scan the beam must be known with an accuracy comparable to the beamwidth. Thus a high resolution shaft position encoder is required to determine the position of the rotating wedges.

The invention provides such a shaft position encoder. The scanner/tracker is programmable which means that it can be operated in a scanning mode in which the beam will systematically scan the field of view with any one of numerous scanning patterns, or it can track any target of interest. To these ends, the two optical wedges are independently driven by high accuracy positional servo systems which have as one input thereof the output of the system processor. The signal processor processes the received echo signals as well as the output of the aforementioned shaft position encoder to facilitate target tracking.

The scanning system and the servo system are designed for high speed, high accuracy operation and to this end the optical wedges, the moveable encoder disc and the rotor of the servo motor are all integrated into one concentric unit. This structure minimizes inertia and also eliminates the backlash which would result if these units were connected by gears.

SUMMARY OF THE INVENTION

To provide the desired versatile scanning capability the optical radar is provided with a pair of in-line or tandem rotating optical wedges which define the radar aperture. The wedges are provided with separate electrical drives comprising high accuracy, high torque, positional, rate damped servo systems. The hollow shaft torque motors of the servo systems permit the optical wedges to be directly driven by the motor rotors. The relative speed and direction of rotation of the optical wedges determines the scanning pattern of the radar beam.

An incremental shaft position encoder is utilized which comprises a moveable transmission disc with a circular array of regularly spaced opaque and transparent sections thereon as well as an index mark. A fiber optic bundle illuminated by a light emitting diode is juxtaposed to the transmission encoder disc so that the LED output passes through the transparent sections thereof as the disc is rotated. The encoder further comprises a stationary mask located on the opposite side of the movable disc from the fiber optic light source. This stationary mask comprises a plurality of non-symmetrically arranged opaque and transparent sections arranged in such a way that the effective resolution of the shaft position encoder is increased by several orders of magnitude. Further, by sensing the half amplitude points of the illumination transmitted through the encoder system, the subsequent circuitry can easily determine the sence of rotation of the moveable disc and the optical wedge. The stationary receiver mask is formed directly onto the end of the fiber optic bundle which forms the encoder's receiver link.

Synchronous detection circuitry is provided for each of the encoder system channels and an up/down counter records the instantaneous position of the optical wedge.

It is thus an object of the invention to provide a scanner/tracker system for an optical radar which is capable of scanning an extremely narrow, coherent, laser-generated beam over a large field of view rapidly and with a cross range resolution which is comparable to the beamwidth of said laser-generated beam.

It is another object of this invention to provide a scanner/tracker comprising a pair of in-line rotating optical wedges wherein each of said wedges is independently controlled by separate rate-damped and compensated servo systems, each comprising a hollow shaft servo motor, and wherein said wedges are mounted within said hollow shaft and each of said wedges has a moveable shaft position encoding disc attached coaxially thereto.

A further object of the invention is to provide a scanner for an optical radar comprising a pair of optical wedges for deflecting the beam of said optical radar, each of the wedges being provided with an incremental shaft position encoder comprising a moveable encoding disc integrally attached to each said wedge and coaxial therewith, each moveable disc being provided with a circular track of black/white coding segments, a light source remote from said scanner with fiber optic bundles arranged to convey light to the vicinity of said moveable discs, and other fiber optic bundles arranged to receive light transmitted through said moveable discs, said other fiber optic bundles having non-symmetric coding patterns integrally attached to the ends thereof which are adjacent to said moveable discs.

A still further object of the invention is to provide a scanning mechanism for an optical radar comprising one or more rotating optical wedges, wherein said wedges are directly driven by hollow shaft torque motors and wherein said wedges are provided with shaft position encoders including a moveable encoder disc directly and coaxially attached to said wedge or wedges, thus providing low-inertia and zero backlash rotating systems capable of high acceleration and highly accurate positioning.

These and other objects and advantages of the invention will become apparent from the following detailed description and the drawings.

DETAILED DESCRIPTION OF A PREFERRED EMBODIMENT

The device of the present invention is part of a Laser Obstacle Terrain Avoidance Warning System (LOTAWS) developed by the US Army for its low flying aircraft. This system includes a heterodyning infra red laser radar which utilizes a low power, high PRF, single frequency, pulsed laser transmitter with a CW local oscillator slaved to the transmitter. The transmitter is a $CO_2$ laser operating at a 10.6 micron wavelength. The transmitter delivers a 340 nanosecond pulse at a repetition frequency (PRF) of 40 kHz at an average power of 2 watts. The transmitter pulses are coupled via a duplexer to the common transmit/receive telescope and scanner. The electronically programmable dual wedge scanner/tracker is capable of directing the transmitter beam anywhere within its conical field of view. The laser beamwidth is 250 microradians and the two separate systems which drive the optical wedges are capable of accelerations of 700 radians per second$^2$ with maximum speed in excess of 10 rps. The returned echo signals are mixed with the local oscillator output at the duplexer and the difference frequency is detected by a liquid nitrogen cooled photovoltaic diode. The pulsed RF from the diode detector is amplified by a wideband preamp prior to initial processing by the narrow bandwidth Doppler tracking receiver.

Figure 1:
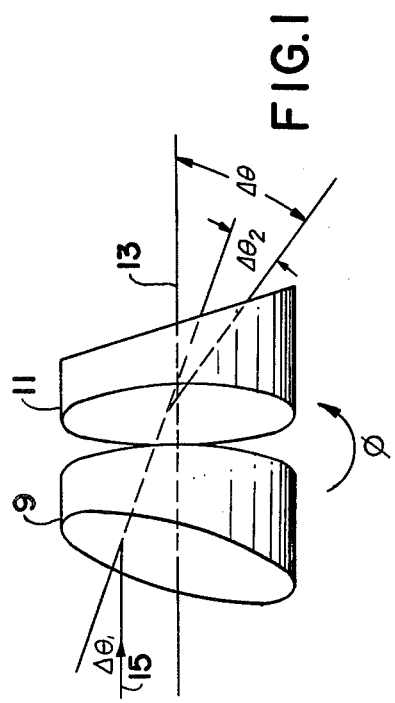
FIG. 1 illustrates how the rotating optical wedges are arranged to provide the scanning mechanism.

The scanner/tracker of this radar system includes a pair of rotating optical wedges arranged in tandem as shown in FIG. 1. The wedges 9 and 11 are shown coaxially aligned with each other around the boresight axis 13 of the radar, this axis also being the axis of rotation of the wedges. The illustrative wedges are both seen to be circular discs with one flat face cut at right angles to the axis of rotation 13 and the other flat face cut at an angle thereto. The wedges are made of germanium which is substantially transparent to the IR radiation of the aforementioned wavelength. An optical wedge of this type with an index of refraction, n, produces an angular deviation of an incident beam of:

$$\Delta\theta = (n-1)\alpha,$$

where $\alpha$ is the mechanical wedge angle. As the wedge is rotated about an axis parallel to the incident beam the magnitude of $\Delta\theta$ does not change but its direction changes so that the output beam describes a cone with an apex angle of $2 \times \Delta\theta$ for every revolution of the wedge.

FIG. 1 shows the wedges phased so that their thin and thick portions are aligned. This phasing yields a maximum deflection of an incident beam such as 15. This beam undergoes an angular deviation of $\Delta\theta_1$, due to the wedge 9 and a further deviation of $\Delta\theta_2$ in wedge 11. The total deviation is thus $\Delta\theta$ which is twice that of each of the individual deviations. Thus a pair of similar optical wedges arranged as shown in FIG. 1 will produce a conical field of view of four times the angular deviation of each of the wedges. The scanning pattern within this field of view will thus depend on the relative senses of rotation of the wedges and the relative speeds. For example, if the wedges have constant angular velocity, opposite senses of rotation will produce line scans when the wedge speeds of rotation are equal, and rosette-like patterns when they have low relative speed differences. When the wedges are rotated in the same direction, spiral scans result from low relative speed of rotation differences, and slewing circular scans result from larger relative speed differences. The servo systems can be programmed to provide an arbitray desired scan pattern by selection of either the relative speeds and senses of rotation of the wedges, or the position of the wedges.

Figure 2:
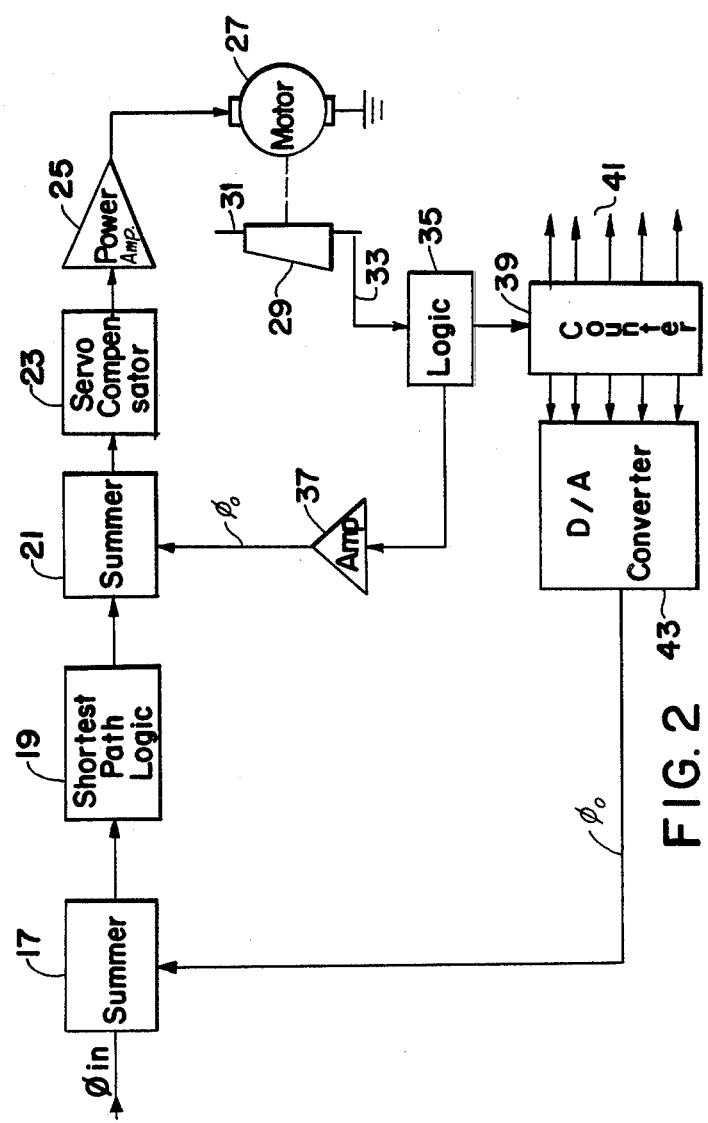
FIG. 2 is a functional block diagram of the servo system used to drive each of the wedges of the scanner/tracker.
Figure 6:
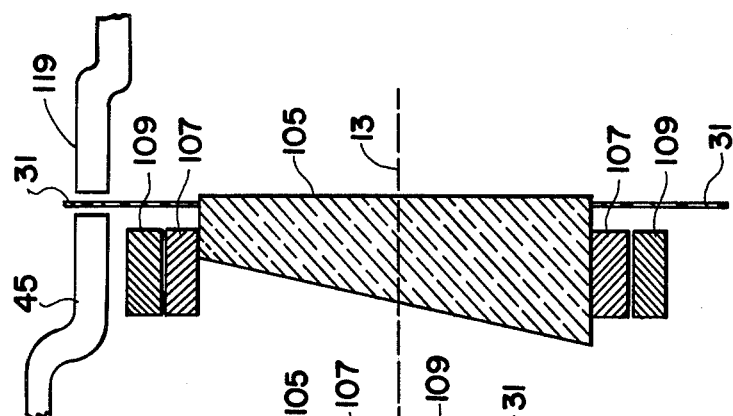
FIGS. 5 and 6 are front and cross-sectional side views, respectively, of one of the optical wedges, showing how the servo motor and the moveable encoding disc are attached thereto
Figure 5:
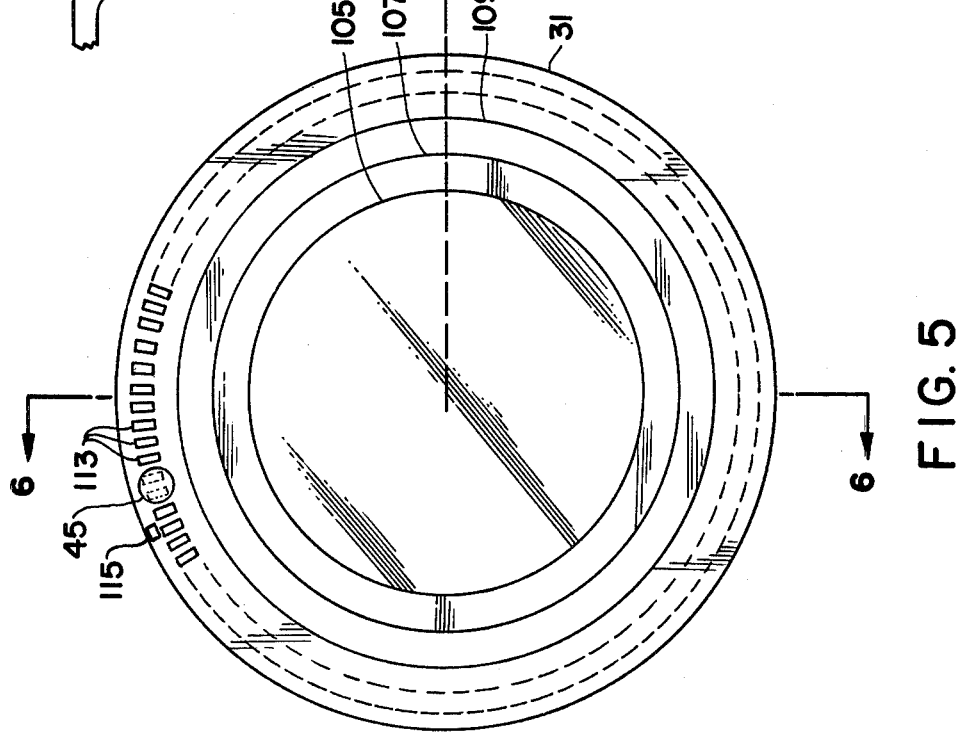

FIG. 2 is a simplified functional block diagram of an implementation of the servo systems. These systems are positional systems in which the instantaneous wedge positions as derived from the shaft position encoders associated with each wedge are compared to a desired position represented by analog voltages applied from external circuitry, for example, from a computer programmed to produce a desired scanning pattern. In FIG. 2 the desired position is represented by the input labeled $\phi_{in}$ at summer circuit 17. The other input of summer 17 is the analog position signal $\phi_0$ which is the output of digital to analog converter 43, the input of which is the digital output to counter 39. The rotating wedge 29 is driven by servo motor 27 through a mechanical connection indicated by the dashed line connecting these elements. The wedge 29 has an encoded disc 31 and the lead 33 represents a means of sensing the encoding disc. This representation is highly schematic and the actual system will be described in more detail in connection with the remaining portions of the drawings. For example, the servo motor is a hollow shaft motor as illustrated in FIGS. 5 and 6, with the wedge mounted within the hollow shaft rotor. Returning to FIG. 2, the logic circuit 35 processes the encoder signals to provide pulses to digital decade counter 39 which are indicative of the angular position of the wedge. The counter outputs on lines 41 represents the wedge position in a digital code. The logic circuit 35 applies a rate signal $\dot{\phi}_0$ to amplifier 37. The amplified rate signal is applied to summer 21 to provide rate damping control to the servo system. The shortest path logic circuit 19 insures that the wedge will take the shortest route to a desired position. The servo compensator 23 and power amplifier 25 complete the servo circuit.

FIGS. 5 and 6 show how the servo motor, the wedge, and the shaft position encoder are arranged for minimum inertia and zero blacklash. The wedge 105 has the moveable encoder disc 31 directly attached thereto so that the two are concentric or coaxial with the axis of rotation 13. The disc is of transparent material, for example clear glass with a circular array 113 of evenly spaced black areas thereon to form an encoding pattern. The clear areas between the black areas are equal in extent to the black areas. Since a system constructed according to this invention requires approximately $2^{12}$ black-white pairs for proper resolution, a system was constructed having 4050 such black and white pairs. In addition a single index mark 115 is provided on the moveable disc 31 as a reference. This encoding system is an incremental system rather than an absolute one in that the circuitry keeps track of the number of black-white segments from the reference or index position to determine the shaft position. A four phase or channel receiver mask is located adjacent the track of segments 113 and senses light passing through the clear segments to provide shaft position signals to the decoding circuitry, shown in detail in FIG. 4. The receiver mask is non-symmetrical in that some of the opaque or black segments thereof differ in width from the spacing of the moveable disc pattern. This arrangement permits the decoding circuitry to sense the direction of rotation of the wedge by sensing the phase or sequence of the light passing through the channels of the receiver mask and also permits a significant increase in the angular resolution of the encoder system. For example, by using the four channel receiver mask the effective resolution of the system is increased from $2^{12}$ to $2^{16}$.

Figure 7:
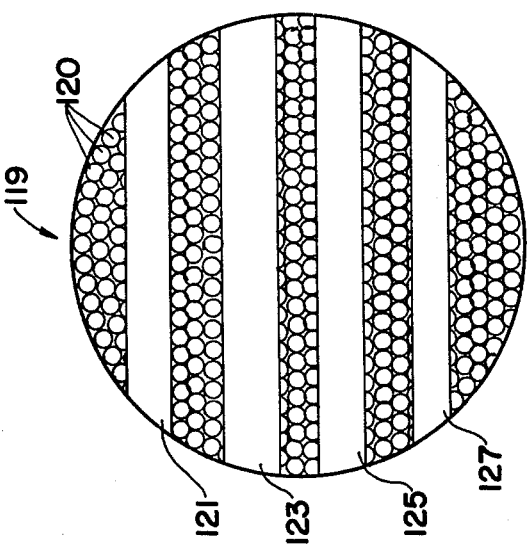
FIG. 7 is an front view of a mask on an end of a fiber optic bundle.

A novel feature of the receiver mask comprises applying opaque material to selected areas of the end of the fiber optic bundle which senses the ligt passing through the moveable encoder disc, to thereby form the four channels of the receiving mask. This receiver mask is shown in FIG. 7. The end of the fiber optic bundle 119 is seen to comprise numerous individual optical fibers such as 120. The sections 121, 123, 125 and 127 represent opaque blanking material which forms the desired receiving mask. The blanking material may comprise black tape, paint or the like applied directly to the end of the bundle 119. The blanked areas differ in width. In practice, after placement of the mask on the end of the fiber optic bundle 119, the appropriate fibers corresponding to each unmasked section are then grouped together at the opposite end, which form the inputs of the decoding circuits.

Returning to FIGS. 5 and 6, a fiber optic bundle 45 is arranged opposite the encoding track 113 of disc 31. Light passed by disc 31 from the bundle 45 is picked up by the receiver fiber optic link 119 with its receiver mask of FIG. 7 on the end thereof adjacent disc 31 but on the opposite side thereof from fiber optic bundle 45. The receiver link 119 is applied to the decoding circuits, the operation of which will be explained in connection with FIG. 4.

As stated, the servo motor has a hollow shaft or rotor 107 with the wedge 105 mounted concentrically within such hollow rotor. As shown in FIG. 6 the servo motor stator 109 surrounds the rotor in conventional fashion.

Figure 3:
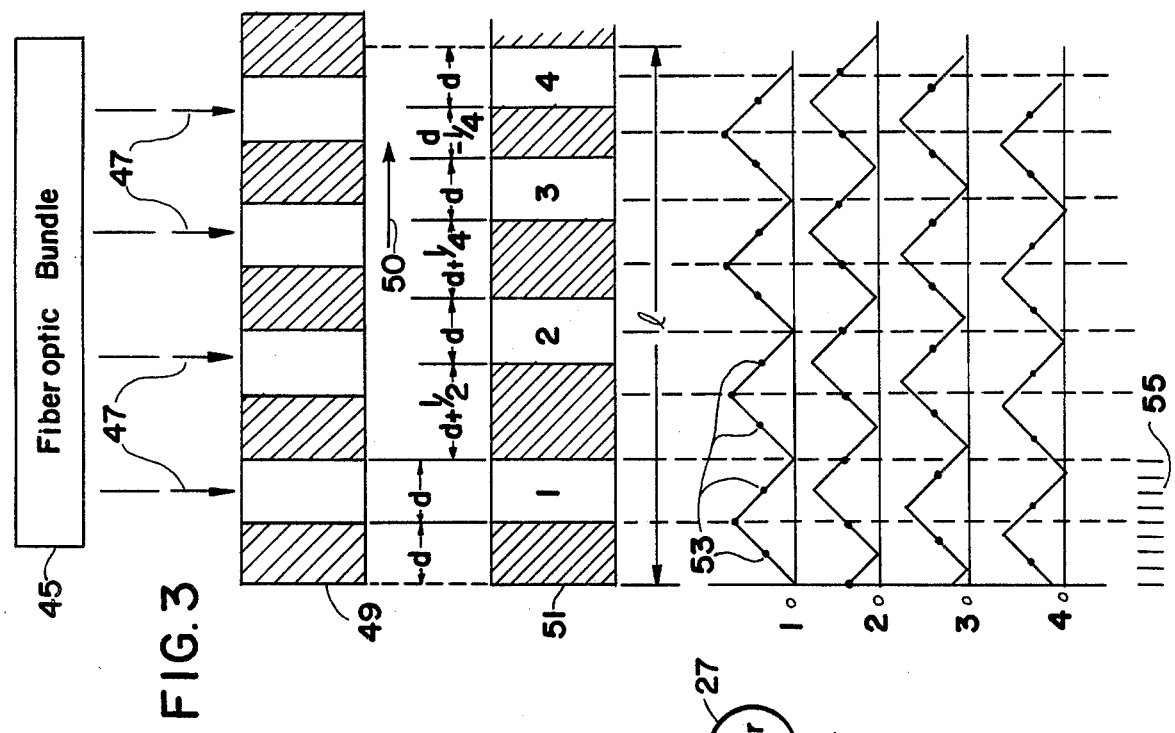
FIG. 3 is a diagram illustrating the operation of the incremental shaft position encoder.

The diagram of FIG. 3 illustrates the principle of operation of the incremental shaft position encoder. Numeral 49 indicates a small developed or flattened section of the black-white pattern 113 of the moveable or transmission disc 31. The numeral 51 represents a section of the receiver mask on the end of the fiber optic bundle 119. The transmitter fiber optic bundle 45 is shown emitting light (or infra red) rays 47 which pass through the white sections of the masks. The output of the receiver fiber optic links 119 terminates in photodetectors which are a part of the decoding circuitry shown in FIG. 4, however for present purposes it is sufficient to say that if the white segments of the two masks are lined up, the photodetector of that channel will have maximum output. If one half of a white segment of mask 51 is blocked by a black segment of disc 49, the photodetector of that channel will show one half of its maximum output, etc. The four receiver channels are numbered 1–4 in the white segments of mask 51 and the triangular waveforms similarly numbered represent the spatial optical output of the four channels. The evenly spaced segments of the moveable mask 49 all have widths "d", as shown, and all of the white segments of mask 51 are also of width "d". However all of the black segments of the receiver mask 51 are of different widths. The first one (on the left) is of width "d", the next one of width 1.5 d, the third one 1.25 d and the last 0.75 d. Thus the length "l" of the pattern of mask 51 is 0.5d longer than 4 black-white pairs of the moveable mask 49. It can be seen that the four triangular waveforms 1 through 4 all differ slightly in phase and this phase difference is utilized to produce the aforementioned increase in resolution. To ths end the one half amplitude points of the four receiver channels are sensed by the decoding circuits of FIG. 4. The half amplitude points for the waveform of channel 1 are indicated by dots 53 and similar dots represent these points for the other channels. The lines 55 at the bottom of FIG. 3 represent the half amplitude points of all four channels. It can be seen that there are eight of these for each black-white pair of the moveable disc and this number accounts for the eightfold ($2^3$) increase in resolution made possible by this arrangement. Further, as will become apparent from the description of the circuit of FIG. 4, the relative timing of the half amplitude points of two of the channels can be used to determine the direction of rotation.

Figure 4:
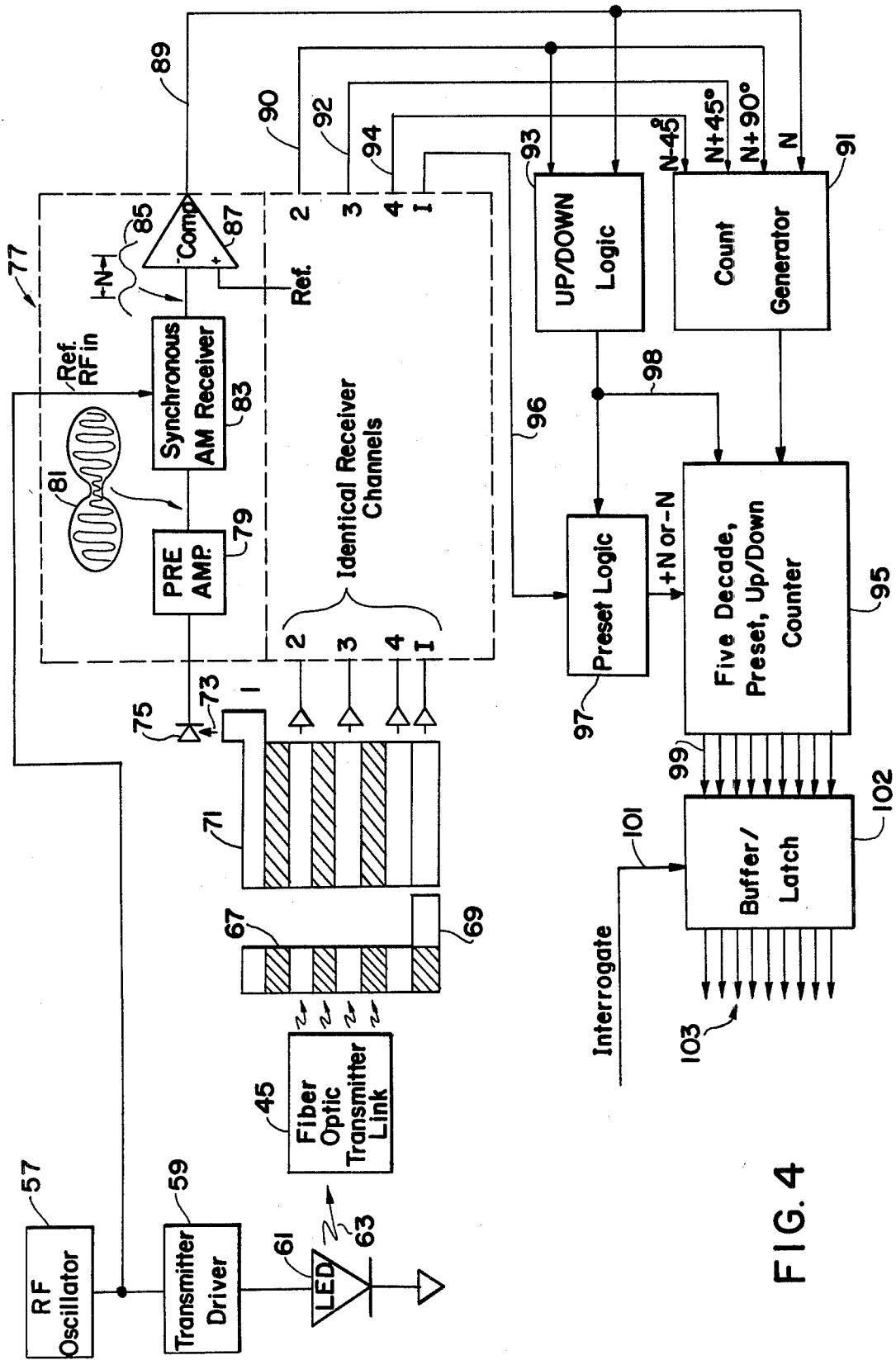
FIG. 4 is a diagram showing the encoder system and the circuitry associated therewith.

The circuit of FIG. 4 includes an RF oscillator which may operate, for example, at 1 MHz. The output of this oscillator is amplified by transmitter driver 59 and then applied to light emitting diode 61. The output 63 of LED 61, which is modulated at the frequency of oscillator 57, is applied to the fiber optic transmitter link 45, also shown in FIG. 6. The black-white pattern 67 represents the moveable disc code pattern labelled as 113 in FIG. 5. The segment 69 is the indexing segment. The receiver mask is represented by numeral 71 and corresponds to the pattern on the end of the receiver fiber optic bundle of FIG. 7. In addition to the four receiver channels shown, an index channel is also provided in the receiver link. Each of the receiver channels terminates at a PIN photodiode. The photodiode for channel 1 is 75 and the light which falls on it from channel 1 of the fiber optic receiver link is indicated by numeral 73. The other channels are indicated by schematic diodes numbered 2-4 for channels 2 to 4, and I for the index channel. The circuitry of channel 1 is shown within the dashed lines labelled 77. The other four channels comprise identical circuitry. Receiver circuit 77 comprises a preamplifier 79 which amplifies the output of diode 75 to produce an amplitude modulated waveform 81 in which the carrier is at the frequency of oscillator 57, with the modulation thereon caused by the action of the two encoding masks. The modulated waveform is synchronously detected in synchronous AM receiver 83 using a sample of the output of oscillator 57 as a reference or local oscillator signal. The output of receiver 83 will be the modulation due to the mask action. This signal is labelled as 85 in circuit 77. The signal 85 forms one input of comparator circuit 87, the other input of which is a dc reference signal, indicated as REF. When the signal 85 equals the reference signal, the comparator 87 puts out a pulse. The reference signal in accordance with the invention is set at half the amplitude of signal 85 so that a pulse is produced on line 89 at the half amplitude points of signal 85. As explained in connection with FIG. 3, the signals applied to the comparator circuits of channels 2 to 4 will all differ in phase with each other and with channel 1. Thus the pulse produced on leads 89, 90, 92 and 94 will all differ slightly in timing or phase, as do the pulses represented at 55 in FIG. 3. Those differences in timing are indicated by the symbols N−45°, N+45°, etc. applied to these leads as they enter count generator 91. Count generator 91 produces eight pulses for each black-white cycle through which the moveable encoder disc travels, and applies these pulses to five decade, preset, up/down counter 95. The up/down logic circuit 93 has as inputs the outputs of the decoding circuitry of channels 1 and 2 and it determines from the relative timing of the pulses on leads 89 and 90 which direction the wedge and its encoder disc are travelling. Logic circuit 93 applies an output signal to counter 95 via lead 98 instructing it whether to count up or down, depending on the sense of rotation of the wedge. Pre-set logic circuit 97 receives the output of the index channel on lead 96 to reset counter 95 to zero when the index mark is sensed by the index channel.

The output leads 99 of counter 95 represent the instantaneous position of the wedge. These are applied to buffer/latch circuit 102 which continually reads the output of counter 95 and transmits this reading to subsequent circuitry, for example to a digital to analog converter such as circuit 43 of FIG. 2. When the buffer/latch circuit 101 is interrogated by a pulse on line 102 it will read the instantaneous state of counter 95 to actuate its output 103 in accordance therewith.

Obvious variations in the disclosed system will occur to those skilled in this art. For example the moveable encoding disc could be of the reflecting type rather than the transmission type, with both the light source and the receiving mask on the same side of the moveable disc. Accordingly the invention should be limited only by the scope of the appended claims.

We claim:

1. A scanner/tracker for an optical radar set, comprising a pair of spaced axially aligned circular rotatable optical wedges which rotate around the boresight axis of said optical radar, motor means for separately driving each of said wedges, each motor means including a rotatable hollow shaft with said wedges mounted within said hollow shafts to rotate therewith, an incremental shaft position encoder including a circular encoder disc extending radially outward of each said shaft, each disc being directly and coaxially attached to each said wedge and being rotatable therewith, each disc including a peripheral circular track of alternating transparent and opaque uniformly spaced coding segments, a modulated light source remote from said scanner/tracker, a stationary fiber optic bundle including a plurality of joined parallel optical fibers having a common end face arranged to convey light from said source to one side of said circular disc coding segments, and a second like stationary fiber optic bundle having an opposing end face on the opposite side of said encoder disc to receive said light transmitted through said transparent disc segments, said opposing end face including a stationary mask having opaque segments of varying dimensions secured thereto, and decoding circuitry means for determining the angular position and direction of rotation of said wedges by sensing the light passed through said rotatable disc segments and stationary mask.

2. The scanner/tracker of claim 1 wherein said modulated light source includes a reference signal and said decoding circuitry means has as an input therof the output of said second fiber optic bundle and wherein said stationary mask includes four channels plus an index channel, said decoding circuitry being arranged to synchronously detect the light modulation in each of the five channels with respect to said reference signal, said decoding circuitry further including means to detect the half amplitude points of each of said four channels and produce a pulse coincident therewith, an up/down counter, and count generator, means to apply said pulses to said up/down counter via said count generator, means to control the direction of the counting of said up/down counter by sensing the sequence of the pulses on two of said four channels, and means to reset said up/down counter in accordance with the output of said index channel.

3. The structure of claim 1 wherein said decoding circuits comprise up/down counters which are incremented when said discs rotate in one direction and are decremented when they rotate in the opposite direction.

4. The scanner/tracker of claim 1 wherein said optical radar includes a coherent laser-generated beam in the infrared region of the spectrum, said wedges being infrared sensitive, said drive means rotating said wedges so that said beam is scanned over a conical field of view as it passes through said wedges, the relative speeds and senses of rotation being adjustable to produce a desired scan pattern, said mask including four non-symmetrical opaque channels arranged so that as said disc rotates the light patterns in said four channels will all be of different phases, and said decoding circuitry is arranged to detect the half amplitude points of illumination of said four channels, thus multiplying the effective resolution of said shaft position encoder by a factor of eight.

* * * * *